United States Patent [19]

Drinane et al.

[11] Patent Number: 5,417,455
[45] Date of Patent: May 23, 1995

[54] FREE-FALLING TIP WITH FULL LOCKING

[75] Inventors: William G. Drinane, New Lenox, Ill.; Gerald A. Doty, Crown Point, Ind.

[73] Assignee: Takata Inc., Auburn Hills, Mich.

[21] Appl. No.: 145,033

[22] Filed: Oct. 29, 1993

Related U.S. Application Data

[63] Continuation of Ser. No. 628,398, Dec. 17, 1990, abandoned, which is a continuation-in-part of Ser. No. 441,308, Nov. 27, 1989, Pat. No. 4,979,764.

[51] Int. Cl.[6] ............................................. A62B 35/00
[52] U.S. Cl. ..................................... 280/808; 24/171; 24/196
[58] Field of Search .................. 280/806, 801, 808; 297/476, 468; 24/171, 196, 194, 639

[56] References Cited

U.S. PATENT DOCUMENTS

| | | |
|---|---|---|
| 706,080 | 8/1902 | Mitchell . |
| 2,377,287 | 5/1945 | White et al. ............ 24/171 |
| 2,754,560 | 7/1956 | Warner et al. ............ 24/196 |
| 2,938,254 | 5/1960 | Gaylord ............ 24/171 |
| 2,948,939 | 8/1960 | Prete, Jr. ............ 24/171 |
| 3,262,169 | 7/1966 | Jantzen ............ 24/196 |
| 3,289,261 | 12/1966 | Davis ............ 24/193 |
| 3,340,578 | 9/1967 | Straight et al. ............ 24/196 |
| 3,414,947 | 12/1968 | Holmberg et al. ............ 24/196 |
| 3,439,932 | 4/1969 | Lewis et al. . |
| 3,442,529 | 5/1969 | Lewis et al. . |
| 3,486,203 | 12/1969 | Cadiou ............ 24/196 |
| 3,551,961 | 1/1971 | Nygren ............ 24/196 |
| 3,588,173 | 6/1971 | Apri ............ 297/386 |
| 3,592,507 | 7/1971 | Glonet ............ 297/368 |
| 3,719,972 | 3/1973 | Klink ............ 24/193 |
| 3,847,434 | 11/1974 | Weman ............ 297/389 |
| 3,888,541 | 6/1975 | Stephenson ............ 297/388 |
| 3,911,535 | 10/1975 | Mauron ............ 24/170 |
| 3,913,977 | 10/1975 | Takada ............ 297/388 |
| 3,928,895 | 12/1975 | Klink ............ 24/196 |
| 3,941,419 | 3/1976 | Blom ............ 297/389 |
| 3,974,546 | 8/1976 | Walker ............ 24/196 |
| 3,975,800 | 8/1976 | Färlind ............ 24/196 |
| 3,981,535 | 9/1976 | Henderson et al. ............ 297/389 |
| 3,997,189 | 12/1976 | deBosredon et al. ............ 280/744 |
| 4,069,554 | 1/1978 | Minolla et al. ............ 24/196 |
| 4,184,234 | 1/1980 | Anthony et al. ............ 24/196 |
| 4,219,236 | 8/1980 | Takada ............ 297/476 |
| 4,310,175 | 1/1982 | Pickett ............ 280/801 |
| 4,310,176 | 1/1982 | Furusawa et al. ............ 280/801 |
| 4,364,584 | 12/1982 | Rogers, Jr. et al. ............ 280/802 |
| 4,371,192 | 2/1983 | Alix ............ 280/801 |
| 4,386,452 | 6/1983 | Stephenson ............ 24/196 |
| 4,392,277 | 7/1983 | Müller ............ 24/196 |
| 4,452,469 | 6/1984 | Rogers, Jr. ............ 280/801 |
| 4,464,811 | 8/1984 | Holmes ............ 24/68 CD |
| 4,480,854 | 11/1984 | Doty ............ 280/806 |
| 4,525,901 | 7/1985 | Krauss ............ 24/200 |
| 4,551,889 | 11/1985 | Narayen et al. ............ 24/196 |
| 4,608,735 | 9/1986 | Kasai ............ 24/196 |
| 4,637,099 | 1/1987 | Kasai ............ 24/200 |
| 4,979,764 | 12/1990 | Drinane et al. ............ 280/808 |

FOREIGN PATENT DOCUMENTS 961402 11/1949 France ............ 24/196
3216075A1 3/1983 Germany .

*Primary Examiner*—Karin L. Tyson
*Attorney, Agent, or Firm*—Fitch, Even, Tabin & Flannery

[57] ABSTRACT

A free-falling, self-locking adjustable tip assembly is provided for a safety belt apparatus, which has a seat belt retractor at one belt end and for rewinding the belt and pulling one belt portion into a generally vertical position at belt release. A tip-assembly engagement means contacts the belt and acts on a slide with a first rib on the slide movable across the top of a tongue plate to wedge the belt between a pair of ribs on an insert carried by the tongue plate. The first rib is on a metal slide means and is located above the tongue plate, as are the pair of ribs on the insert. The locking of belt prevents transfer of the belt from the shoulder portion to lap portion is at a location above the tongue plate. When the tip assembly is unbuckled, the grip is released and the tip assembly free falls along the belt.

12 Claims, 4 Drawing Sheets

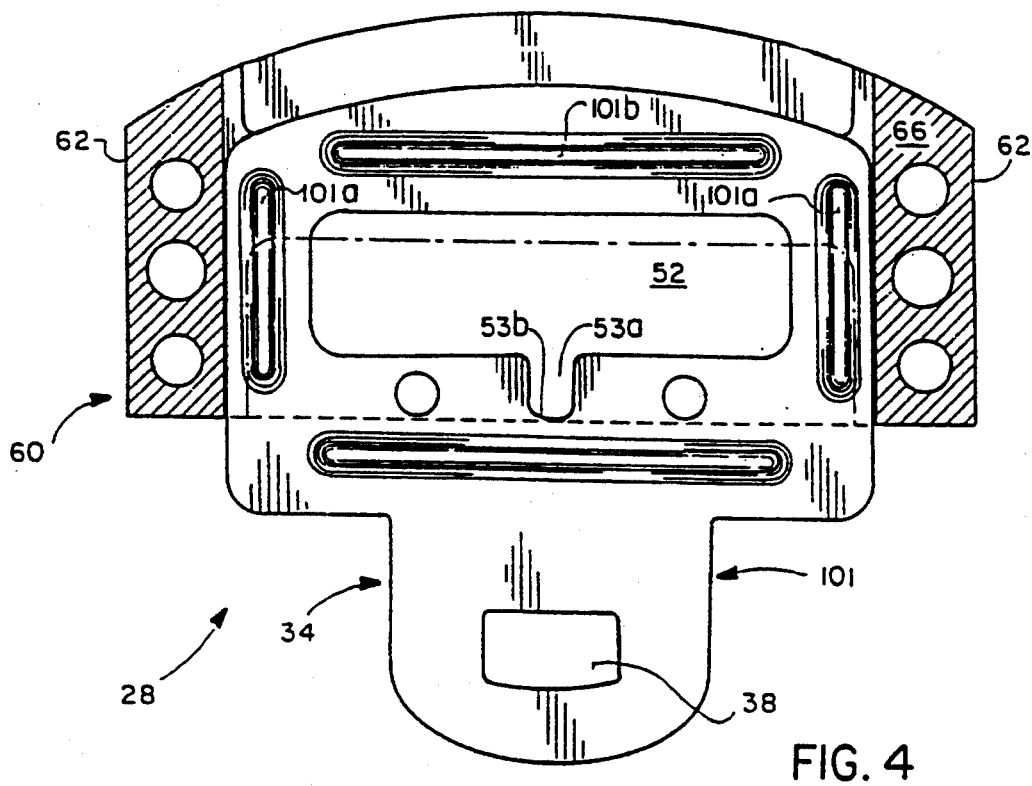
FIG. 4
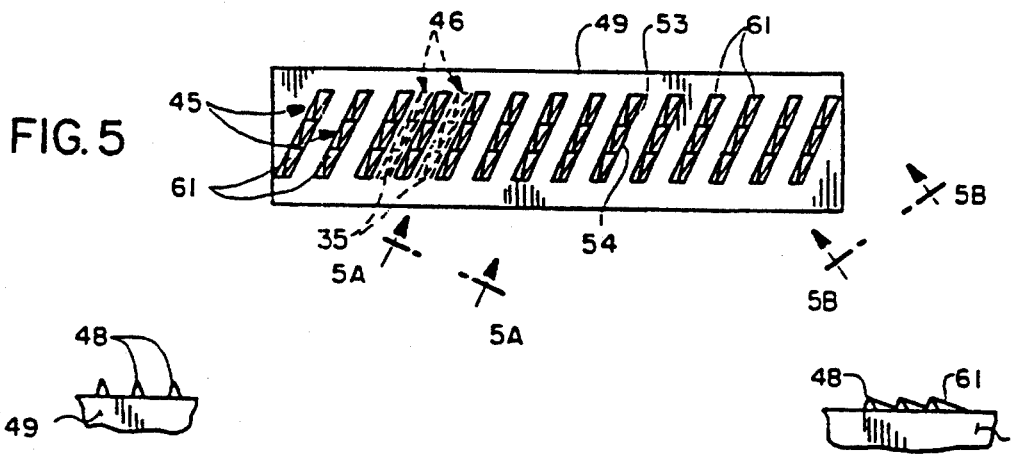
FIG. 5
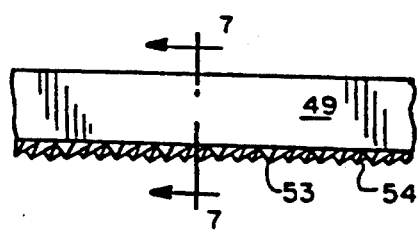
FIG.5A
FIG. 6
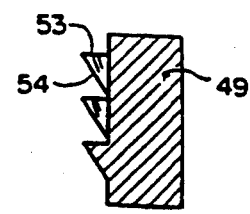
FIG. 5B
FIG. 7

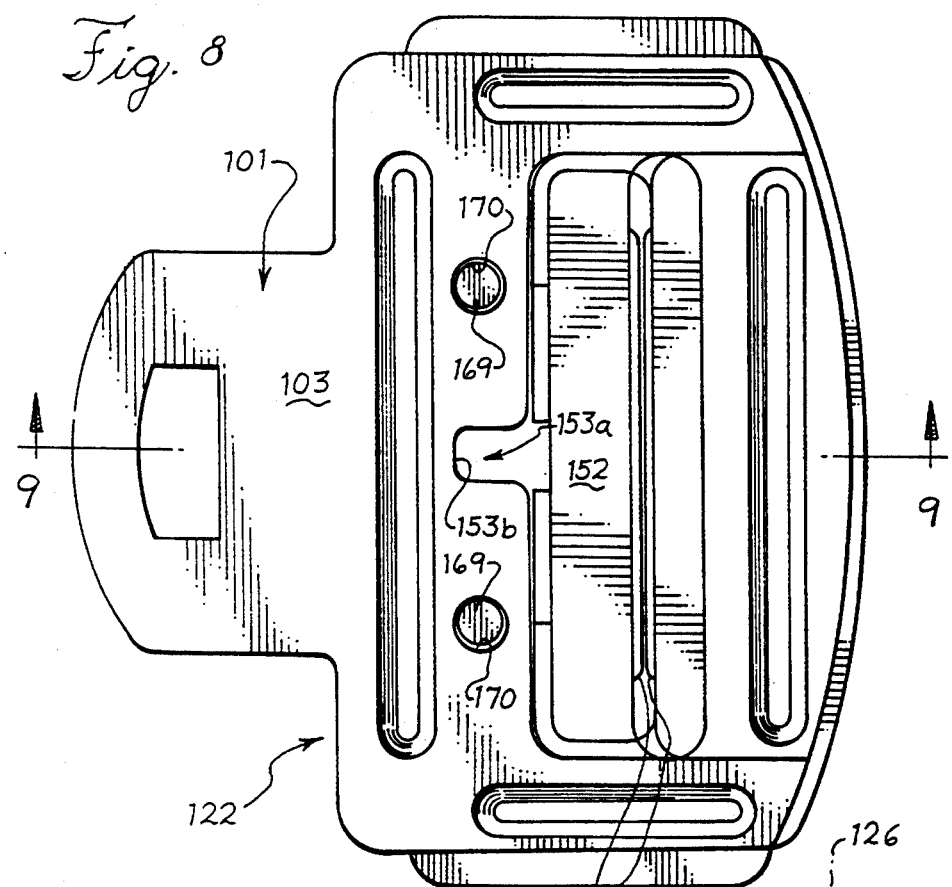
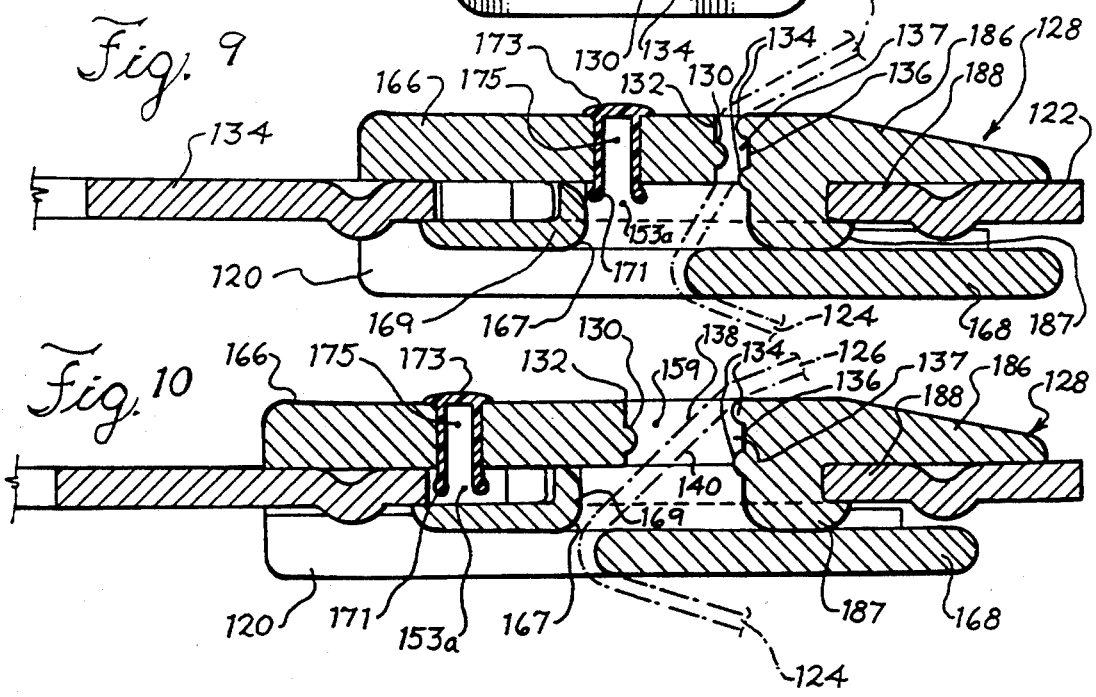

FREE-FALLING TIP WITH FULL LOCKING

This application is a continuation, of application Ser. No. 628,398 filed Dec. 17, 1990, now abandoned, which in turn is a continuation-in-part of application Ser. No. 441,308, filed Nov. 27, 1989 now U.S. Pat. No. 4,979,764.

FIELD OF THE INVENTION

In general, the present invention is directed to an apparatus for a free-falling, self-locking, adjustable tip assembly for seat belt systems. More particularly, the present invention is directed to seat belt tip assembly which has a releasable belt engaging device that does not abrade the belt form engaging forces under high-locking and normal use circumstances.

BACKGROUND OF THE INVENTION

The present invention is directed to what is often termed a free-falling, self-locking, adjustable tip assembly which has been previously described in U.S. Pat. Nos. 4,480,854 and 4,588,207. In these patents, the tip assembly is freely slidable on the belt so as to regularly adjust its position when the retractor rewinds the belt after its usage by a vehicle passenger. The usual manner of operation of such a tip assembly is that when the seat belt retractor begins to reel in the belt and the belt with the tip begins to move upwardly, the tip thereafter slides downwardly or does not move upwardly to a relatively high position with the upwardly traveling belt. On the other hand, the free sliding tip assembly is desired to be self-locking or snubbing across the passenger at a position across the lap of the passenger to prevent the shoulder portion of the seat belt from traveling through the tip assembly to a lower lap portion of the seat belt.

While the present invention may be usable in such a seat wherein the occupants are seated, as described in these patents, it is particularly directed to the situation of locking a baby seat in the rear seat of the vehicle. More specifically, it is desired to have a free-falling, self-locking, adjustable tip assembly in the rear seat which can be pulled across the baby seat and locked into a buckle at the rear seat. At the time of locking, it is desired that the lap portion of the belt which is across the baby seat be snubbed, or tightly held, so that the baby seat does not tilt or slide on the rear seat. Of course, when a person is seated on the rear seat, the locking tip will lock the lap portion of the belt at a fixed length so that a portion of the shoulder belt portion will not slide through the tip assembly to lengthen the lap belt. The shoulder belt is connected to the seat belt retractor at the upper end of the belt; and these retractors are usually inertia retractors that do not lock until the time that the inertia weight or means is operable, upon a sudden deceleration, to lock the retractor against further belt protraction from the retractor reel. The lap portion of the seat belt extends between an anchored end of the belt at the seat bench position and the buckle that is also fastened to the vehicle and positioned at the central portion of the rear seat bench. It is this fixed length lap portion between the buckle and the anchored belt end that should have a fixed locked length to hold the baby seat on the vehicle rear seat. Seat belt webbing from the upper shoulder belt should not be allowed to move through the tip assembly and into the lap belt portion and thereby allow the baby seat to shift its position. The desired locking or gripping for the tip assembly is in the range of 1,200 to 1,600 pounds of force on the belt.

Present specifications require the holding of the belt by the tip assembly to be at least 1,200 pounds and with a safety factor, to be 1,600 pounds. One of the particular problems of finding such a high-locking force is the criteria that the tip must be free-falling. Also, a further requirement is that the locking at such a high force will be not a one-time situation in which the tip is so wedged or otherwise connected so that it cannot be slid down the belt after a high force locking of 1,200 to 1,600 pounds.

In addition, it is desirable that the particular locking structure be such that it does not readily abrade the belt and meets abrasion cycle tests which are necessary for commonly-used seat belts that are used over and over again.

The construction shown in U.S. Pat. No. 4,480,854 has worked well for the use in the front seats and other seats where it is used; and it cannot be used in its present state for the rear seat usage to hold a baby seat because, in tests, it is found that it only holds up to 300 pounds before the belt slips through the snubbing means. On other hand, U.S. Pat. No. 4,588,207 is designated to slip at a very light load, for example, a 50 pound load.

While other devices have been tried, a number of them had the ability to hold the web against slipping at high loads, but they cannot be disconnected because the pieces were so jammed together after a 1,200 to 1,600 pound load that the tip would no longer slide on the belt. Such a tip would have but only a single use and would have to be replaced or tools would have to be used to try to separate the snubbed parts. On the other hand, the present invention provides a structure which will readily separate and be free-falling after a locking force in excess of the 1,200 to 1,600 pound range, and, in fact, the present invention has been successfully operated to grip with loads of 2,100 pounds and still release and be free-falling on the belt.

BRIEF DESCRIPTION OF THE DRAWINGS

FIG. 4 is a plan view of the tip assembly.

FIG. 5 is an elevational view of an insert having the preferred locking teeth.

FIG. 6 is an plan view of the insert of FIG. 5.

FIG. 7 is a cross-sectional view of a tooth insert body taken along the line 7—7 of FIG. 6.

FIG. 8 is a plan view of a tip assembly constructed in accordance with a further embodiment of the invention.

FIG. 9 is a cross-sectional view taken substantially along line 9—9 of FIG. 8.

FIG. 10 is a cross-sectional view of the tip assembly of FIG. 8 in an unlocked condition.

DETAILED DESCRIPTION OF THE INVENTION

Figure 1:
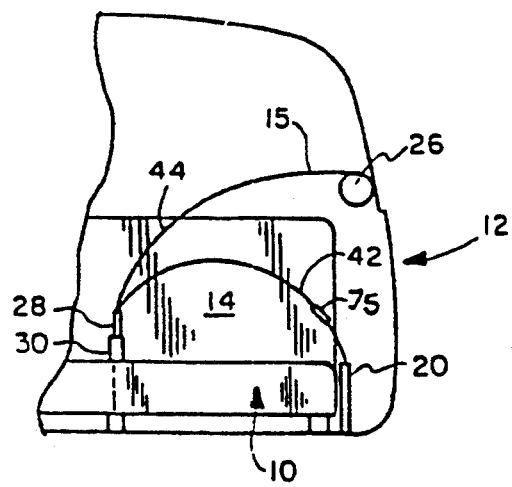
FIG. 1 is a schematic illustration of a seat belt apparatus showing the belt with the tip assembly thereon holding a baby seat on a rear seat of a vehicle.
Figure 1A:
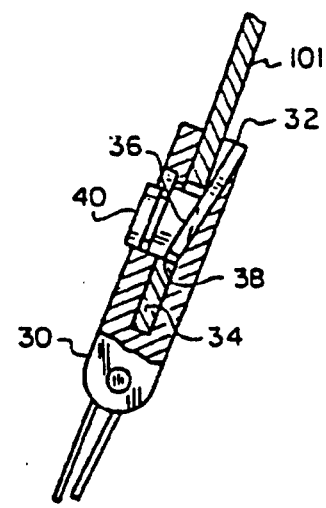
FIG. 1A is an enlargement view of the tip assembly and buckle in the buckled position.

As shown in the drawings for purposes of illustration, the invention is embodied in a seat belt apparatus 12 mounted in a vehicle having a rear seat 10, upon which is positioned a baby seat 14. A seat belt is connected at one end 15 to a seat belt retractor 26 which is located upwardly of the vehicle seat and near a passenger's head and a pillar of the vehicle. The seat belt has a tip assembly 28 thereon which can be connected to a buckle 30 which has a typical buckle opening 32 (FIG. 1A) into which a tongue plate or tip 34 on the tip assembly is inserted. A locking pawl 36 is spring biased to a locking condition and is adapted to ride over the tongue 34 and to snap into locking in the opening 38 and the tongue to thereby latch the tip assembly to the buckle. A release button 40 typically further is associated with a buckle to disengage the locking pawl from the opening 38 to release the tip assembly from confined securement with the buckle.

Figure 2:
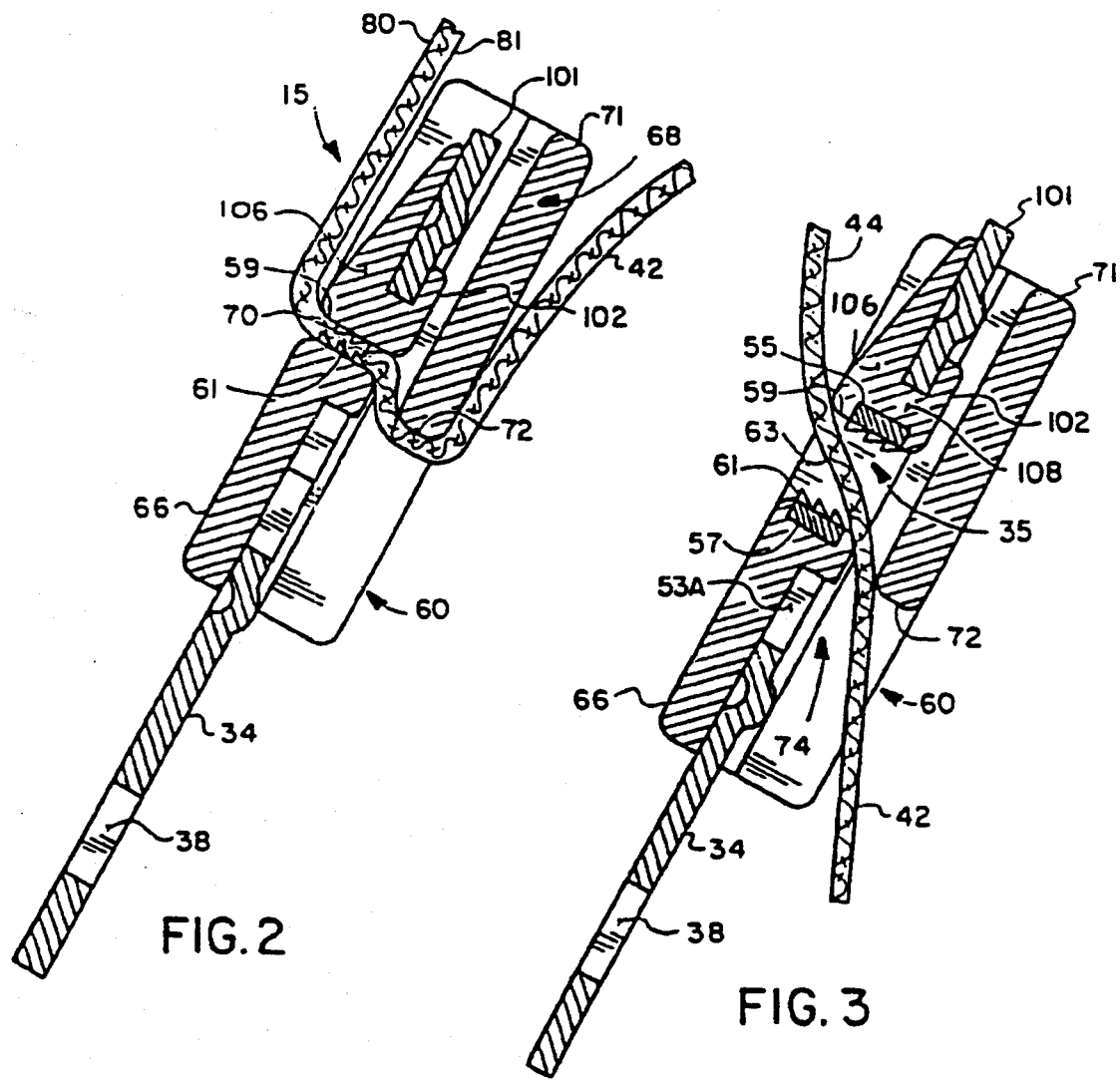
FIG. 2 is a view illustrating the tip assembly in an unlocked condition.
Figure 3:
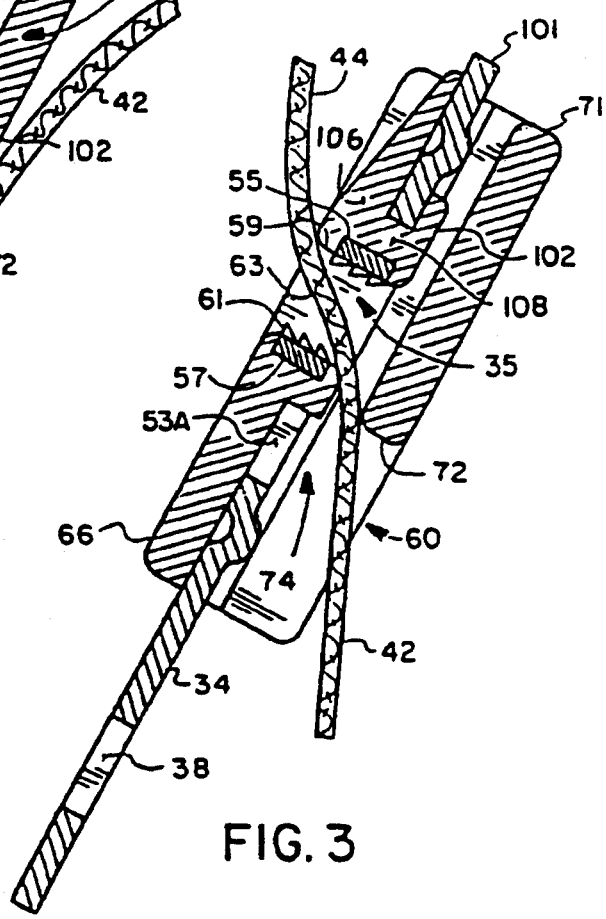
FIG. 3 is a view showing the tip assembly in its locked condition.

The locking tip assembly 28 includes an elongated, flat metal plate or tip body 101 the forward end of which is narrowed to form the tip 34 and includes a snubber slide 60 that slides on the tip body 101 between the release position shown in FIG. 3 in which the tip slides freely down the belt and locking position shown in FIG. 2 in which the belt is gripped in a nip between the slide and the insert 56. That is, in the buckled condition, with the retractor pulling a force upon the belt portion 44, the slide portion 60 cooperates with a snubber bar 68 on the tip or tongue plate. The belt is inserted through an opening 63 (FIG. 3) in the snubber slide 60 and an aligned opening 52 in the tip body 101. The belt is entrained about a forward edge 72 of the snubber slide which draws the snubber slide upwardly along the tip until the gripping edge 70 on the slide 60 and the facing grip edge 59 on the tip body 101 tightly squeeze the inner positioned belt. In this belt-gripping position, the tightly-pinched belt 15 precludes slippage at predetermined load range conditions.

In the device shown in U.S. Pat. No. 4,480,854, the gripping and locking load was about 300 pounds; and any force applied beyond that overcame the gripping action and allowed the belt to slip.

The problem addressed by the present invention is how to increase the gripping or locking force to preclude belt movement through the nip of the belt gripping means at very high tensile loads, e.g. in excess of 1,200 to 1,600 pounds and yet release the tip assembly for a free-falling movement when the load was released. Initial experiments were made with various configurations which would wedge together and hold against slippage at 1,200 to 1,600 pound loads, but the wedged parts could not be separated by the hands of a person trying to pull the pieces apart. In other instances, the application of a 1,200 to 1,600 pound load bent the parts permanently from their original shape such that they should not or could not be reused after loading.

Figure 11:
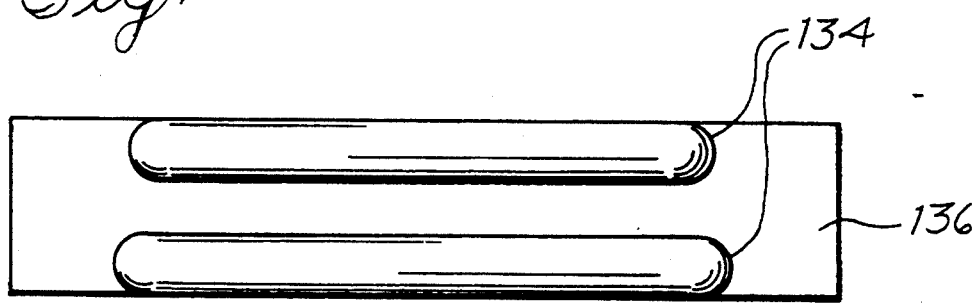
FIG. 11 and FIG. 12 are elevational views of the preferred locking ribs.
Figure 12:
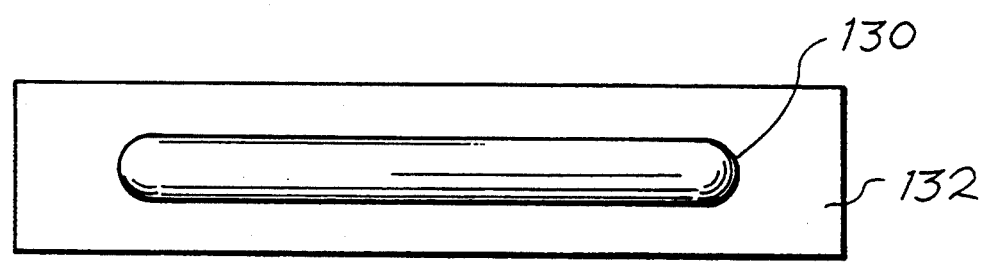

In accordance with the present invention, the free-falling tip assembly has releasable gripping means 71 on the slide 60 and on the tip body 101 which are movable from the release position of FIG. 3 to the gripping or locking position of FIG. 2 such that a pulling force of 1,200 pounds and greater exerted on belt portion 42 pulling to the right as shown in FIG. 2 is not able to cause the belt to be pulled through the gripping means. Upon release of a 1,200 pound load, the slide and tip may be separated manually without the use of tools; and the tip assembly will again slide down the belt and assume the release position, as shown in FIG. 3. This locking of the belt at a 1,200 pound load is achieved by a gripping means which preferably comprises gripping ribs 130 and 134 (FIGS. 11 and 12) or which preferably comprises a first set of teeth 61 on the slide 60 and a second set of teeth 35 on the insert 56 with the respective sets of teeth being on opposite sides 80 and 81 of the belt and each biting into the belt to give a non-sliding grip. The preferred sets of teeth are in very small rows 45 of teeth 61 and are in very small rows 46 of teeth 35. The rows are offset from each other so that the teeth of one row will not hit point-to-point the opposite teeth of the opposing set of teeth. As shown in FIG. 5, the teeth 35 of rows 46 are located to move into spaces between the rows 45 of teeth 61.

The preferred and illustrated sets of teeth 61 and 35 are in rows 45 and 46 which are oblique to the longitudinal axis or dimension of the belt so that there is not a straight axial biting into the belt. In the embodiment shown in FIG. 5, the rows of teeth are at an angle of 24° relative to the longitudinal axis or dimension of the belt which will be square with the insert body 49 on which the teeth are integrally formed. Also, it is preferred to have a large or wide surface area over which to spread the gripping force being applied to the belt. To this end, the rows of teeth extend laterally substantially across the full width of the belt being gripped. Thus, not all of the load is centered at the middle of the belt which might tear the center of the belt caught in the nip of the opposing sets of teeth. Herein, there are three teeth in each vertical row so that the load is applied not as a straight, thin, pinching line from a single horizontal line of teeth, but is spread over a broader vertical area of three vertically-spaced lines of teeth to thereby distribute the load vertically as well as horizontally across the belt.

The load is also preferably distributed across a large number of very small and very fine teeth 35 and 61 in each teeth set which teeth are integrally-formed on their respective insert bodies 49. The insert bodies are mounted in recess or grooves 55 and 57 (FIG. 3) on the gripping edge 70 of the slide and gripping edge 59 on the insert 56, respectively. Preferably, the inserts and teeth are made of glass-filled nylon in molded blocks with the teeth molded integrally with the insert body. Herein, the slide 60 is formed of metal rather than plastic as disclosed in the U.S. Pat. No. 4,588,207, to be able to withstand the high loads applied thereto without deforming or breaking. The preferred metal for the slide is a die cast body of aluminum or zinc alloy although other metals and means of making the slide could be used to withstand the loads applied. Also, to assure a better grip and biting, the individual teeth have flat upper edges 53 (FIG. 7) and downwardly-sloping surfaces 54. The preferred teeth are generally triangular in shape and have the sizes and dimensions shown in FIG. 5. Both sets of teeth 35 and 61 are identically formed and their insert bodies 49 are identical except the teeth 35 are shifted over one row space on the body for the teeth 61.

Turning now to a more detailed description of the invention, the tip assembly 28 includes an elongated generally-planar tongue plate or tip frame or tip body 101, which includes a flat steel plate which has a narrow tongue or tip 34 at its forward end with a locking opening 38. The tip body 101 has a rectangular opening 52 which helps define the belt receiving slot. A pair of stamped ribs 101a (FIG. 4), flanking the lateral sides of the opening and stamped rib 101b flanking the longitudinal sides of the opening, give the frame body additional strength. A channel 53a is cutout in the frame body 101 and extends forwardly from the rectangular portion of the opening 52. A detent 74 on the snubber slide 60 slides in the channel 53a and its forward end will abut a stopping surface 53b at the front end of the channel to hold the snubber slide 60 against sliding forwardly from the tip frame 101.

To accommodate the insert body 49 having the teeth 35, which is thicker than the plate of the tip body 101, the tip body 101 is provided with an enlarged rear liner body 106 (FIG. 3) made of metal with a channel 108 for receiving a rear tip bar portion 56 of the tip body 101 behind the slot opening 52 in the tip body 101. The liner body 106 has a wide front face 59 facing the belt with the slot 55 therein to receive the teeth insert body 49. The force transmitted at the time of gripping from the toothed insert 49 is transmitted through the tapered upper bar portion of the liner body 106 into the tongue plate body 101. A lower portion 108 of the liner body 106 extends into the tongue plate body 101. A lower portion 102 of the liner body 106 extends beneath the rear tip bar portion 56. The lower tooth 35 is backed by the rear tip bar portion 56 because it is the plane defined by thickness of the tongue plate while the upper teeth project above the tongue tip plate body 101.

The snubber slide means 60 is slidably mounted on the tip frame 101 prior to the belt 15 being inserted through the slot 52. The snubber slide 60 as best seen in FIG. 3, is a closed, channel-shaped body having a longitudinally-extending slot 63 defined by four walls including a top wall 66 and a bottom wall 68 joined to a pair of short, sidewalls 62 or corner sections. The top wall 66 and the bottom wall 68 are generally flat, planar parallelograms.

The load of 1,200 to 1,600 pounds or greater is applied to the snubber slide 60 against its bottom wall 68 at its forward edge 72, (FIG. 2) by the belt portion 42 which exerts a load, e.g., of 1,200 to 1,600 pounds to pull the snubber slide 60 upwardly and rearwardly to cause both sets of teeth 35 and 61 to bite into the belt. The bottom wall 68 of the snubber slide 60 comprises a relatively wide bar extending from a transverse, forward edge 72, which abuts the belt when the tip assembly 28 is buckled, as seen in FIG. 2, to a rear transverse edge 71. The forward transverse edge 72 of the bottom wall 68 is located forward of the teeth 35 mounted on upper rear edge 70 of the top wall 66, as clearly shown in FIGS. 2, 3 and 4 so that the snubber teeth 61 bite into side 80 of the belt and force teeth 35 of the stationary tip frame 101 to also bite into side 81 of the belt 15. The bottom wall 68 of the snubber slide 60 is free to slide underneath the rear portion of the tip frame 101 when the tip is buckled in the manner disclosed in U.S. Pat. No. 4,480,854 which is hereby incorporated by reference as if fully reproduced herein.

When the tip assembly 28 has been assembled with the belt 15 fed therethrough, the belt passes through the frame slot 52 and also through slot 63 in the snubber slide 60. As best seen in FIG. 3, the normal weight in balance caused by the heavier lower end of the tip or tongue 34 will cant the tip assembly 28 relative to the vertical belt run 18 as seen in FIG. 3. In this free-falling position of FIG. 3, the snubber slide 60 has moved forwardly along the tip frame 101 from the belt-gripping position of FIG. 2, and this allows the tip assembly to slide freely with the edges 70 and 59 on the snubber slide 60 and the frame 101, respectively, sliding along the forward and rearward sides 80 and 81 of the belt. The unbuckled tip assembly 28 is thereby free to slide downward along the belt run 42 until stopped by some means, such as a stop 31 on the belt.

In order to engage the tip assembly 28 operatively with the buckle 30, the occupant merely grasps the tip assembly 28 and moves the same in a lateral direction and slides the tip assembly along the belt 15 until the tongue 34 is brought to latch with the buckle 30, feeding out during this effort sufficient belt webbing to define the engaging span of belt 42 which will be about the baby seat or about the lap of the person seated where the baby seat would be located. There is also left a shoulder-engaging span 44 of the belt which will engage a person seated on the rear seat or which will engage the back bench portion of the rear seat. When the tip assembly is engaged with the buckle, the pull of the retractor 26 exerts an upward and rightward force on the forward edge 72 of the tip assembly, as viewed in FIGS. 1 and 2, to lift the snubber slide 60 in this same direction to the belt-gripping position, as seen in FIG. 2. In this position, the belt shoulder portion 44 trained about the forward edge 72 of the snubber slide 60 draws the snubber slide upwardly along the tip frame 101 until the upper gripping portion 70 on the snubber slide 60 brings its gripping teeth 61 into engagement with the belt side 80 facing it and thereafter pushing the other side 81 of the belt into the second set of teeth 35 on the grip portion 72 of the rear liner body 106, thereby tightly gripping and interlocking the teeth 35 and 61 into the belt 15. In this position, the tightly gripped belt 15 is precluded from any further withdrawal of the belt webbing in the direction toward the lap-engaging portion 42 with loads up to 1,200 to 1,600 pounds which would tend to enlarge the lap-engaging portion.

It has been found that after the application of a 1,200 to 1,600 pound load that one can grasp manually the snubber slide 60 and move the snubber slide downwardly to release the teeth 61 from the belt webbing side 80 and also by pulling on the tip body 101, one can move its teeth 35 to release the side belt. Thus, the tip assembly 28 is free for sliding movement along the belt 15 after such interlocking.

In another embodiment of the present invention, depicted in FIGS. 8, 9, 10, 11 and 12, the free-falling tip assembly has releasable gripping means on the slide 120 and on the tip body 122 which are movable from the release position of FIG. 10 to the gripping position of FIG. 9 such that a pulling force of 1,200 pounds and greater exerted on the belt 124, as shown is FIG. 9, will not allow the belt 126 to be pulled through the gripping means. Upon release of this force from the belt 124, the slide 120 and tip body 122 may be separated manually without the use of tools. The tip assembly 128 will again slide down the belt and assume the released position of FIG. 10.

This locking of the belt at 1,200 pound load is achieved by a gripping means having the first rib 130 on the gripping edge 132 of the slide 120 and the pair of ribs 134 on the gripping edge 136 of the rear liner 186 with the respective combinations of ribs being on the opposite sides 138 and 140 of the belt and each engaging the belt to give a non-sliding grip. The preferred ribs are offset from one another so that the ribs will not hit point-to-point of the opposing rib. As shown in FIGS. 9 and 10, the rib 130 of the gripping edge 132 of the slide is located to move into space 137 between the ribs 134 on the gripping edge 136 of the rear liner. The tip body 101 includes the tongue plate 34 which is made of steel to take the high tensile loading that may be applied thereto at the time of an accident, and this tensile force may exceed by several times the 1,200 to 1,600 pound load in which the gripping means is intended to hold. The preferred slide body on the tip plate 34 and the rear liner body 186 on the tip plate are each made of a die cast metal of zinc or an aluminum alloy. The ribs 130 and 134 are integrally molded to the slide body and the rear liner body, respectively. The preferred ribs are elongated horizontal ribs that are parallel and have rounded, outer edges that will grip when wedged tightly toward each other under high pulling loads, e.g. of 1,200 to 1,600 pounds without cutting or severing the belt as would sharp edges on the ribs. The integral ribs 130 and 134 are less expensive than the separate inserts having glass filled, molded teeth as illustrated in FIGS. 5-7.

The snubber slide includes a top wall 166 and a bottom wall 168 which are generally, flat horizontal plates that are parallel to each other. The tongue plate is slid through a slot 167 between the upper and lower walls. The tip body 101 includes a channel 153a which is cut out in the tongue plate 122 and extends forwardly from the main rectangular portion of the opening 152 toward the tongue 103 where a detent pin 173 is driven through a circular aperture 175 (FIG. 8) down to have the top of the pins flush with the upper surface of the top wall to project the lower end 171 of the pins into a slot 153a formed in the tongue plate. The lower end 171 of the pin abuts the opposite end 153b wall of the slot in the tongue plate to limit sliding of the snubber slide relative to the tongue plate and to prevent the snubber slide from sliding off the tongue plate. A pair of solid cylindrical projections 169 (FIGS. 8-9) extend through a pair of holes 170 in the rigid frame body 101 flanking the channel 153a which contribute to the locking snap fit of the assemble.

The tongue plate also supports a rear liner body 186 made of metal which receives the rear bar portion 188 of the tongue plate. The rear liner body has the wide front wall 136 with the two, parallel locking ribs 134 thereon opposite the locking rib 130 on the snubber slide. A lower portion 187 on the liner body extends beneath the tongue plate section 188, as seen in FIGS. 9 and 10. Further, the surface of the ribs can have a slight texture which creates minimal friction between the gripping edge and the belt.

It is preferred to have a large or wide surface area over which to spread the gripping force being applied to the belt. The ribs extend laterally substantially across the full width of the belt being gripped. Here, the load is not concentrated in the center of the belt, but rather the load is spread over the width of the belt. In the present invention, the ribs do not have means which would abrade the belt. Overall, the spreading of the load and the absence of any teeth or sharp gripping means will reduce the abrading of the belt.

From the foregoing, it will be seen that there has been provided a fully locking, free-falling tip assembly which slides readily upwardly or downwardly along the belt and which, when brought to its locking position, has means which will fully grip and hold the belt against very high loads and which has the strength and ability to not fail under loading as high as 1,200 to 1,600 pounds or more. The teeth do not destroy the belt; and the toothed grip on the belt can be removed by the person grasping and pulling apart the slide 60 and the frame from the belt 15 and the tip assembly can continue in their usage. The particular configuration allows the belt to slide and the teeth or ribs are situated in a position so that they do not normally abrade the belt during ordinary usage. Thus, the belt will not be abraded and will survive a lifetime or a cycle of time so as to meet standards.

While a preferred embodiment has been shown and described, it will be understood that there is no intent to limit the invention by such disclosure; but rather it is intended to cover all modifications and alternative constructions falling within the spirit and the scope of the pended claims.

What is claimed is:

1. In a safety belt apparatus, the combination comprising:

a safety belt having a shoulder portion and a lap portion, a seat belt retractor connected to one end of the safety belt and pulling on the belt for rewinding the belt and for pulling a portion of the belt into a generally vertical position when the belt is released for full retraction, a tip assembly slidably mounted on the belt and having a tongue plate for connection to a buckle, and slide means on the tip assembly shiftable by the tongue plate hanging downwardly and with the belt in the vertical position to allow free sliding of the tip assembly downwardly along the belt, said slide means having an opening through which the belt passes, a slot in the tongue plate with the belt passing from a top side of the tongue plate through the slot and through the opening to a bottom side of the tongue plate, a belt gripping insert on the tongue plate adjacent the slot in the tongue plate, belt engaging means on the slide means pushing the slide to a belt gripping position by the belt lap portion under tension from the retractor when the tongue plate is connected to the buckle, and releasable gripping means on the slide means and tip assembly movable to a gripping position for gripping the belt to hold the belt against slipping therebetween at loads equal to or greater than 800 pounds applied to the belt, the releasable gripping means including a single, gripping rib with a rounded surface on the slide means to grip the belt and to slide along the belt when it is free sliding without abrading the belt, a pair of gripping ribs with rounded surfaces on said belt gripping insert spaced apart and parallel to the single gripping rib on the slide means, said single gripping rib being aligned with a space between the pair of ribs to wedge the belt between the pair of ribs when the slide means is in a gripping position, said slider means sliding in a plane parallel to the tongue plate to position the single gripping rib in the space between the pair of gripping ribs with the belt being wedged simultaneously against the pair of ribs, said single rib and said at least part of each rib of pair of ribs being located above the slot in the tongue plate to grip the belt at a location above the tongue plate, the releasable gripping means being movable to a release position after having been moved to the gripping position to allow a subsequent free falling of the tip assembly along the belt.

2. An apparatus in accordance with claim 1 in which the slide means is a die cast metal body having the gripping means included in the die casted metal body.

3. An apparatus in accordance with claim 2 in which the gripping means are die casted ribs.

4. An apparatus in accordance with claim 1 in which the tip body is a die cast metal assembly where the gripping means are included in the die casted metal body.

5. An apparatus in accordance with claim 4 in which the gripping means are die casted ribs.

6. An apparatus in accordance with claim 1 where the ribs extend laterally across the full width of the belt being gripped.

7. In a safety belt apparatus, the combination comprising:
- a safety belt having a shoulder portion and a lap portion,
- a seat belt retractor connected to one end of the safety belt and pulling on the belt for rewinding the belt and for pulling a portion of the belt into a generally vertical position when the belt is released for full retraction,
- a tip assembly slidably mounted on the belt and having a tongue plate for connection to a buckle, the tongue plate having an upper slide surface, and slide means on the tip assembly shiftable by the tongue plate hanging downwardly and with the belt in the vertical position to allow free sliding of the tip assembly downwardly along the belt,
- said slide means sliding along the upper slide surface of the tongue plate,
- said slide means having an opening through which the belt passes and having an upper interior surface,
- a slot in the tongue plate with the belt passing from a top side of the tongue plate through the slot and through the opening to a bottom side of the tongue plate,
- a belt gripping insert on the tongue plate adjacent the slot in the tongue plate,
- belt engaging means on the slide means pushing the slide to a belt gripping position by the belt lap portion under tension from the retractor when the tongue plate is connected to the buckle, and
- releasable gripping means on the slide means and tip assembly moveable to a gripping position for gripping the belt to hold the belt against slipping therebetween at loads equal to or greater than 800 pounds applied to the belt, the releasable gripping means including a single, gripping rib with a rounded surface on the slide means to grip the belt and to slide along the belt when it is free sliding without abrading the belt, a pair of gripping ribs with rounded surfaces on said belt gripping insert spaced apart and parallel to the single gripping rib on the slide means, said single gripping rib being aligned with a space between the pair of ribs to wedge the belt between the pair of ribs when the slide means is in a gripping position, said slider means sliding in a plane parallel to the tongue plate to position the single gripping rib in the space between the pair of gripping ribs with the belt being wedged simultaneously against the pair of ribs, said single rib and at least part of each rib of said pair of ribs being located above the slot in the tongue plate to grip the belt at a location above the tongue plate, said pair of gripping ribs on said belt gripping insert including a lower rib located at the plane of the upper slide surface and an upper rib located adjacent the upper interior surface of the slide means, the releasable gripping means being moveable to a release position after having been moved to the gripping position to provide a free path through the tip assembly to allow a subsequent free falling of the tip assembly along the belt.

8. An apparatus in accordance with claim 7 in which the slide means is a die cast metal body having the gripping means included in the die casted metal body.

9. An apparatus in accordance with claim 8 in which the gripping means are die casted ribs.

10. An apparatus in accordance with claim 7 in which the tip body is a die cast metal body where the gripping means are included in the die casted metal body.

11. An apparatus in accordance with claim 10 in which the gripping means are die casted ribs.

12. An apparatus in accordance with claim 7 where the ribs extend laterally across the full width of the belt being gripped.

* * * * *

UNITED STATES PATENT AND TRADEMARK OFFICE
CERTIFICATE OF CORRECTION

PATENT NO. : 5,417,455
DATED : May 23, 1995
INVENTOR(S) : Drinane, et al.

It is certified that error appears in the above-indentified patent and that said Letters Patent is hereby corrected as shown below:

IN THE CLAIMS:

Column 8, line 64, change "and said at least part of each rib of pair" to --and at least part of each rib of said pair--.

Signed and Sealed this

Twenty-fourth Day of October, 1995

Attest:

BRUCE LEHMAN

*Attesting Officer*   *Commissioner of Patents and Trademarks*